May 14, 1929.　　　R. C. McCRACKEN　　　1,712,835
TUBE CLEANER
Filed June 17, 1927
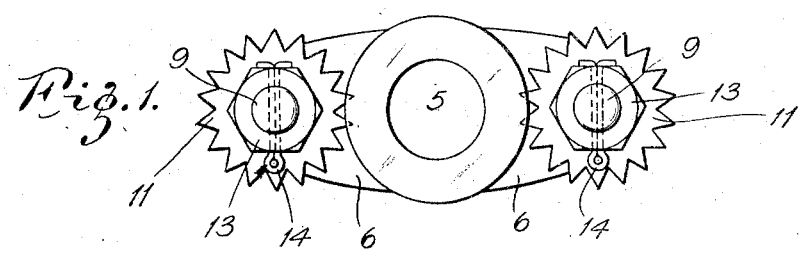
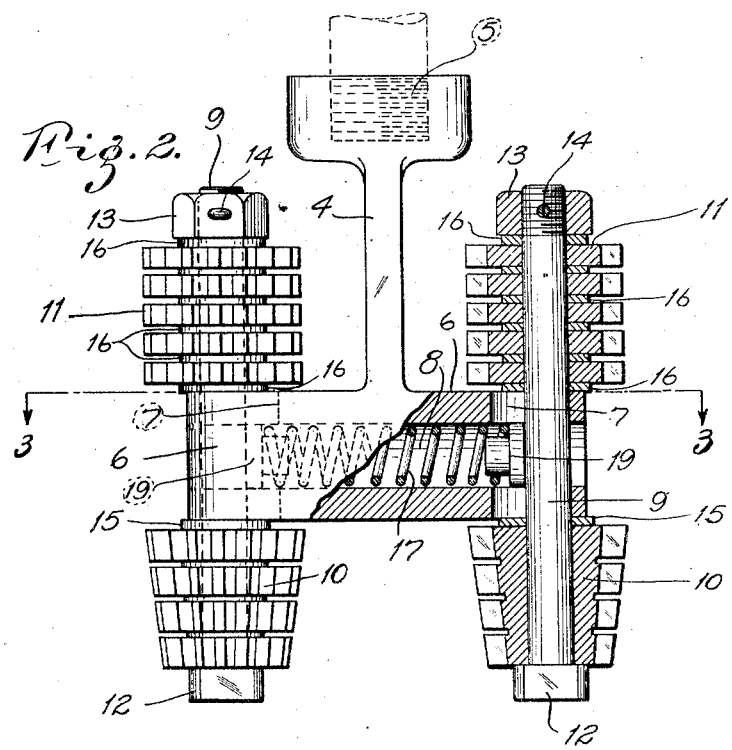
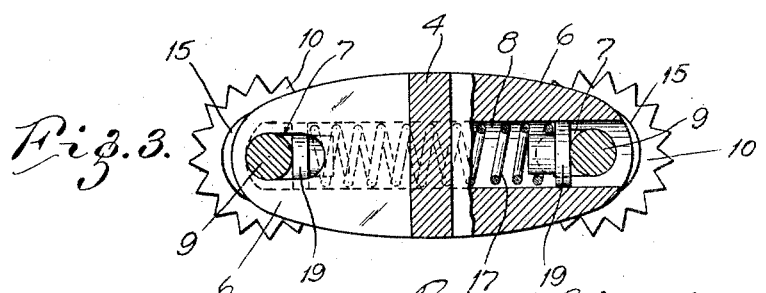
INVENTOR
Robert C. McCracken
HIS ATTORNEYS Patented May 14, 1929.

1,712,835

UNITED STATES PATENT OFFICE.

ROBERT C. McCRACKEN, OF ST. LOUIS, MISSOURI, ASSIGNOR OF ONE-HALF TO NORMAN STEWART, OF WEBSTER GROVES, MISSOURI.

TUBE CLEANER.

Application filed June 17, 1927. Serial No. 199,452.

My invention relates to centrifugal tube cleaners, particularly those intended for use in removing scale from the tubes of boilers or stills. The principal objects of the present invention are to produce a light, strong and durable tube cleaner of simple and inexpensive construction that is easily assembled and easily operated at high speeds with great efficiency and is not likely to get out of repair. Another object is to provide for free movement of the rotary cutters radially of and at an angle to the axis of the cutter head to enable said cutters to automatically accommodate themselves to the surface of the work. The invention consists in the parts and in the combinations and arrangements of parts hereinafter described and claimed.

In the accompanying drawing, which forms part of this specification and wherein like symbols refer to like parts wherever they occur, Fig. 1 is an end view of the rotary tube cleaner embodying my invention;

Fig. 2 is a side view of said cleaner, parts being shown in longitudinal section; and Fig. 3 is a cross section on the line 3—3 in Fig. 2, one of the cross arms being shown in longitudinal section.

The rotary cleaner head shown in the accompanying drawing is substantially T-shaped; that is, comprises a shank portion 4 having at its inner end a threaded axial bore 5 for connection with the rotary driving member (not shown) and having at its outer end two diametrically opposed radially extending cross arms 6. Each cross arm of the T-shaped cutter head is provided near its outer end with an elongated slot 7, the two slots being deposed radially with respect to the axis of the cutter head and being diametrically opposed. The two slots are connected by a diametrical bore 8 which extends longitudinally of the cross arms and opens through the outer end of one of said arms.

Mounted in the radial slots in the outer ends of the oppositely extending cross arms of the T-shaped cutter head are cutter shafts or pins 9, which extend far enough beyond the front and rear faces of said arms to rotatably support front and rear cutters 10 and 11, respectively. As shown in the drawing, the front and rear cutters, together with the cutter shafts, are held at a place by heads 12 on the front ends of said shafts and by castle nuts 13 and cotter pins 14 on the rear ends of the shafts. The front cutters 10 are preferably shown in the form of one piece cone cutters that are spaced away from the cross arms of the head by washers 15, while the rear cutters are preferably made up of a number of toothed wheels which are spaced away from each other, the nuts 13 and the cross arms of the cutter head by washers 16.

Mounted in the diametrical bore 8, which connects the two radial slots 7, is a coil spring 17 and two bearing members in the form of headed pins 19. The pins 19 are slidably arranged in the diametrical bore 8 with their heads in abutting relation to the cutter shafts 9; and the spring 17 is arranged in said bore between said pins in position to force said pins outwardly against said cutter shafts. By this arrangement, the single spring 17 operates to force both of the radially movable cutter shafts outward in the radial slots in the arms of the cutter head, while the spring pressed bearing members or pins 19 are adapted to serve as fulcrums on which the cutter shafts are adapted to rock in substantially all positions of their radial sliding movements.

The cleaner may be readily assembled by inserting the spring 17 and bearing members 19 into the bore 8 through the open end thereof, then inserting cutter shafts 9 in the radial slots 7, and then securing the front and rear cutters 10 and 11 to the said cutter shafts by means of the castle nuts 13.

In the use of the cleaner the cutters are forced inwardly towards each other a distance sufficient to permit the cleaner to enter the tube that is to be cleaned. The scale is then removed from the tube by passing the cleaner through the tube while the cleaner is being rotated at a high rate of speed. During the rotation of the cleaner the cutters are forced outwardly by centrifugal force into engagement with the deposit on the inner surface of the tube, the front cutters operating to remove part of the deposit and the rear cutters operating to remove the remainder of deposit. In addition to the radial and rotary movement of the cutters, they are also adapted for limited angular movement with respect to the cutter axis in substantially all positions of their radial movement, thereby permitting said cutters to adjust or accommodate themselves automatically to the surface of the work. The spring 17 serves to cushion the cutter shafts when the cutters strike an obstruction and are thrown inwardly; and it also tends to center the cleaner in tube.

Obviously, the hereinbefore described device admits of considerable modification without departing from the invention; therefore, I do not wish to be limited to the precise arrangement shown and described.

What I claim is:

1. A cutter head for rotary tube cleaners comprising a body portion provided with elongated diametrically opposed slots, cutter shafts rotatable and slidable in said slots with their ends extending therebeyond, cutters on the projecting ends of said shafts, said cutters operating to prevent axial movement of said cutter shafts in said slots, and a single spring in said head between said shafts for forcing said shafts outwardly in said slots, said spring being located intermediate the ends of said shafts, whereby said shafts are adapted to rock or oscillate around a region near their middle to permit the cutters on the ends of the shafts to accommodate themselves automatically to the work.

2. A cutter head for rotary tube cleaners comprising a body portion provided with elongated diametrically opposed radial slots connected by a diametrical bore, cutter shafts in said slots and extending on opposite sides thereof, cutters on the projecting ends of said shafts and operating to prevent axial movement of said shafts in said slots, and a spring mounted in said bore between said shafts for forcing said shafts outwardly in said slots.

3. A cutter head for rotary tube cleaners comprising a body portion provided with elongated diametrically opposed radial slots connected by a diametrical bore, cutter shafts in said slots and extending on opposite sides thereof, cutters on the projecting ends of said shafts, and a spring mounted in said bore between said shafts for forcing said shafts outwardly in said slots, said bore opening through one side of said head, whereby said spring is adapted to be inserted in and removed from said bore through the open end thereof.

4. A cutter head for rotary tube cleaners comprising a body portion provided with elongated diametrically opposed radial slots connected by a diametrical bore, cutter shafts in said slots and extending on opposite sides thereof, cutters mounted on the projecting ends of said shafts, bearing members mounted in said bore between said shafts, and a spring mounted in said bore between said bearing members for forcing the same into engagement with said shafts, said bearing members bearing against said shafts intermediate the ends thereof and constituting fulcrums on which said shafts rock in adjusting themselves to the surface of the work.

Signed at St. Louis, Missouri, this 10th day of June, 1927.

ROBERT C. McCRACKEN.